March 29, 1960   L. L. NEIDENBERG ET AL   2,930,941
PUNCH CARD CONTROL SYSTEM
Filed April 3, 1956   6 Sheets-Sheet 1

INVENTORS
LAWRENCE L. NEIDENBERG
VICTOR TAMBURR
JAMES A. HUNT
BY
Pennie, Edmonds, Morton, Barrows + Taylor.
ATTORNEYS

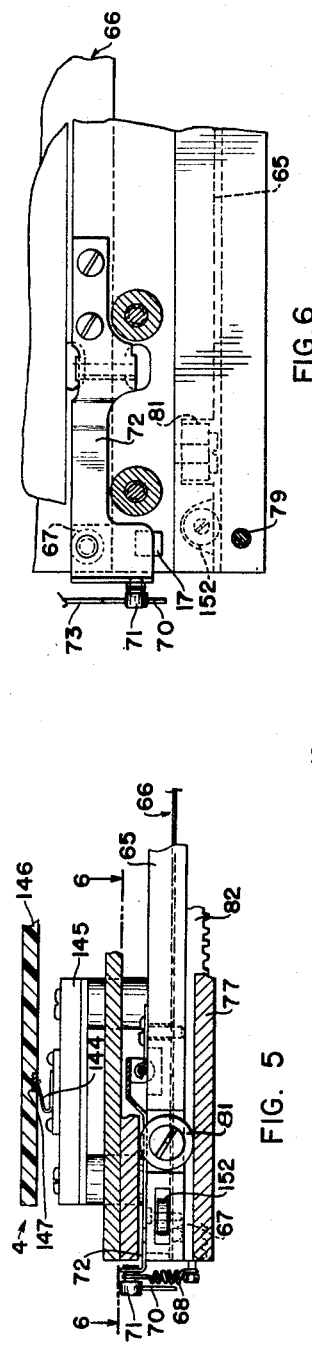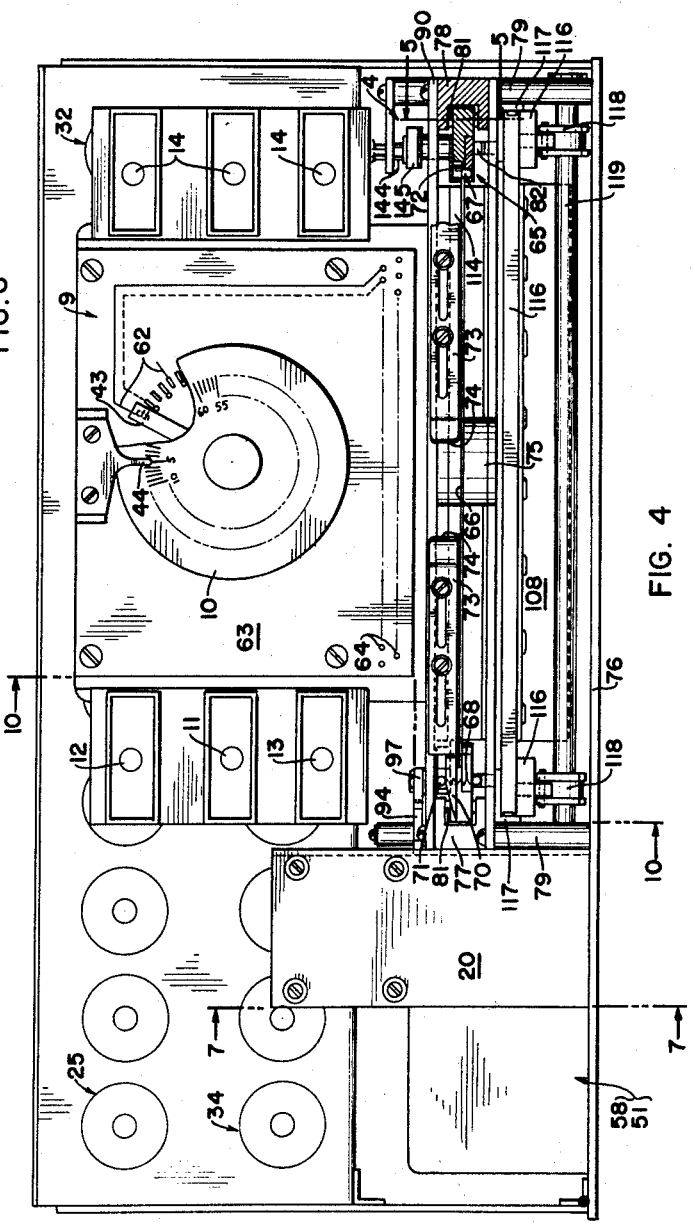

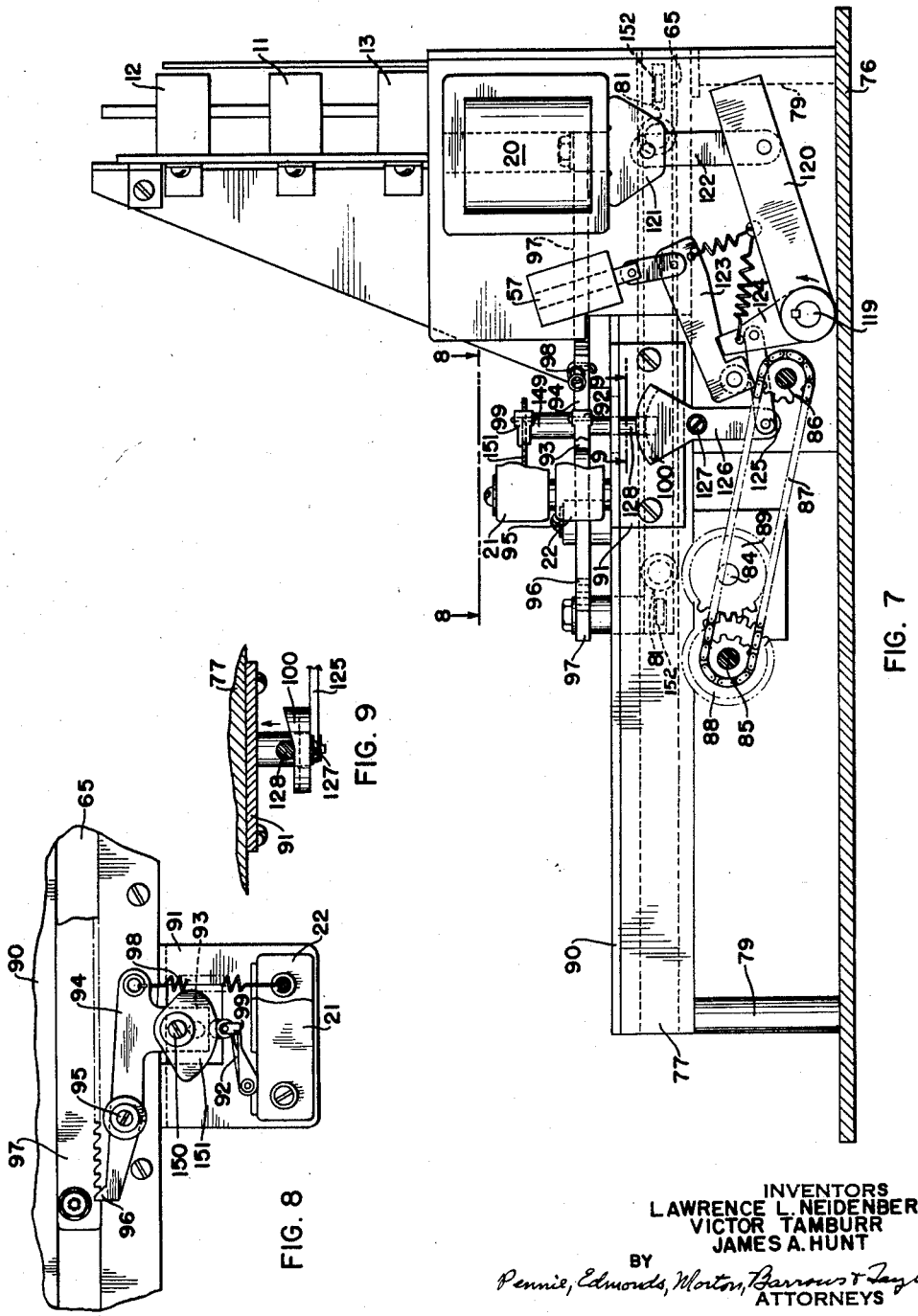

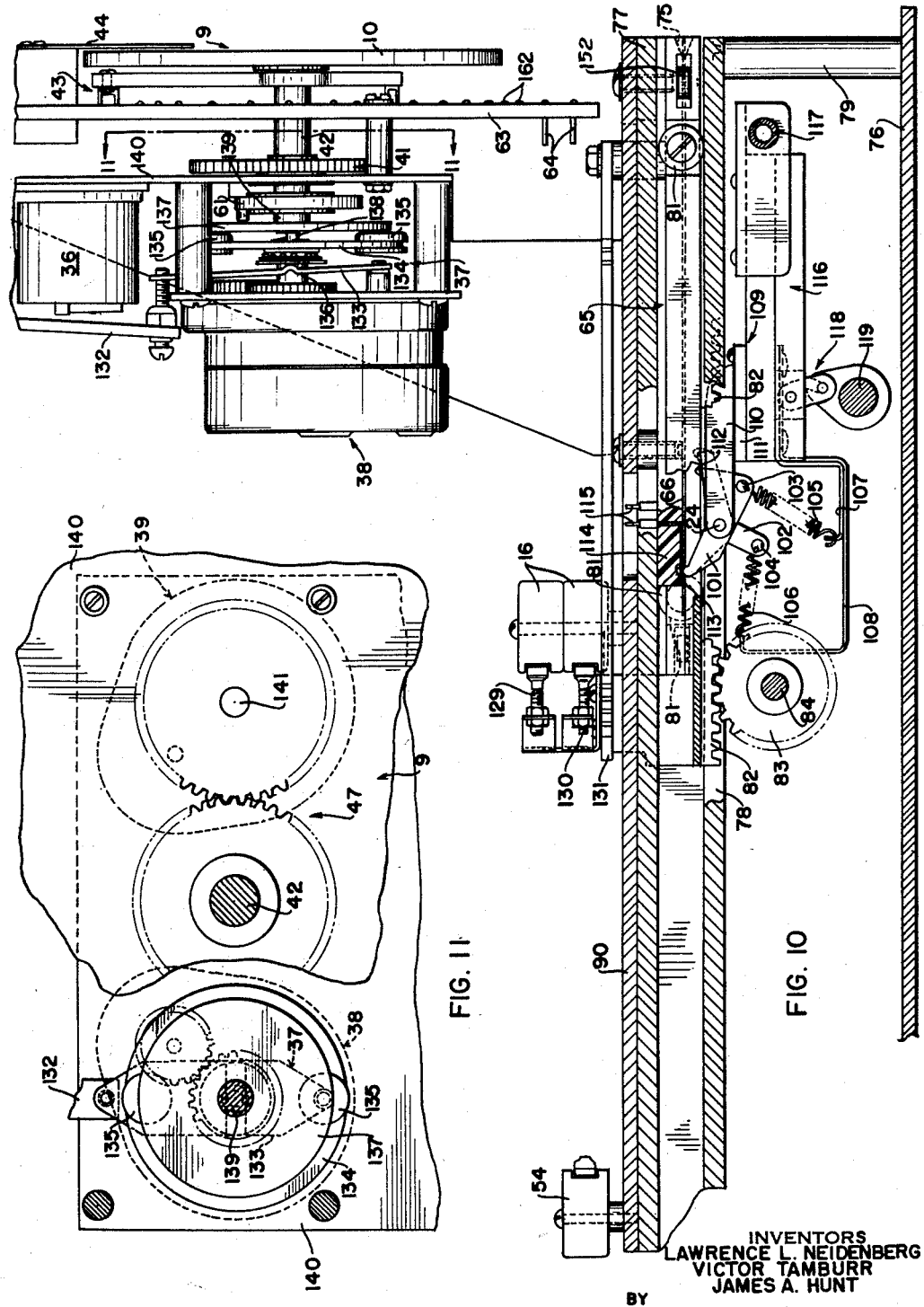

United States Patent Office 2,930,941
Patented Mar. 29, 1960

2,930,941

PUNCH CARD CONTROL SYSTEM

Lawrence L. Neidenberg, Maplewood, Victor Tamburr, Passaic, and James A. Hunt, Union, N.J., assignors to Industrial Timer Corporation, Newark, N.J., a corporation of New Jersey Application April 3, 1956, Serial No. 575,787

17 Claims. (Cl. 317—139)

This invention relates to automatic control systems, and especially to time-based systems controlled by punch cards.

Heretofore, automatic sequence control of various processes and mechanical and electrical operations in industry has been effected by synchronous timers or mechanical sequence controls. In some, the sequences have been initiated and terminated by punch cards, but, if accurate timing were involved, each timed stage of the operating cycle required a separate timing mechanism. As a result, controls involving a large number of load circuits and many timed sequences required many synchronous timers connected in a large, complicated and expensive system. Furthermore, the manual adjustment of the various timers was a cumbersome and slow procedure which had to be repeated whenever the timing was changed.

On the other hand, in the system according to this invention, all of the sequences of as many load circuits as necessary may be controlled simultaneously or individually by a single punch card at any desired time intervals measured in seconds, minutes, and hours. Furthermore, the timed cycle in respect to any selected load circuit may be manually or automatically interrupted at any desired phase or stage of operation and resumed manually or automatically by actuation of a remotely controlled circuit responsive to some characteristic or function other than, or including, time. Yet the apparatus provided to achieve this extreme flexibility requires but a single timer mechanism and is much smaller, simpler and cheaper than other comparable equipment. Since the designation of the external load circuits to be controlled or actuated and the sequences and nature of actuation, as well as the time periods of actuation, and the repetition or termination, are all predetermined by the location of holes in a punch card, any desired change in any or all of these functions may be made merely by inserting a differently punched card in the instrument.

The instrument here illustrated comprises, in general, means for holding and transporting a punch card between card-scanning contacts, self-setting timer means arranged to measure time intervals, terminals to which external load circuits and remotely operated control circuits may be connected, power source connections, and various mechanisms and inter-connecting circuits including relays and automatically actuated switches to effect the described functions and operation. In addition, several manual controls are included, and also indicators to show the nature of the controls in use and the control stage or phase as the cycle progresses.

The nature of the invention and its many advantages will be understood from the following description considered in connection with the accompanying drawings in which:

Fig. 4 is a front elevation of the instrument of Fig. 3 with the cabinet and the upper section removed;

Fig. 5 is a sectional view taken along the line 5—5 of Fig. 4;

Fig. 6 is a sectional view taken along the line 6—6 of Fig. 5;

Fig. 7 is a sectional view taken along the line 7—7 of Fig. 4;

Fig. 8 is a sectional view taken along the line 8—8 of Fig. 7;

Fig. 9 is a sectional view taken along the line 9—9 of of Fig. 7;

Fig. 10 is a sectional view taken along the line 10—10 of Fig. 4; and

Fig. 11 is a sectional view taken along the line 11—11 of Fig. 10 with parts broken away.

Punch card

Figure 1:
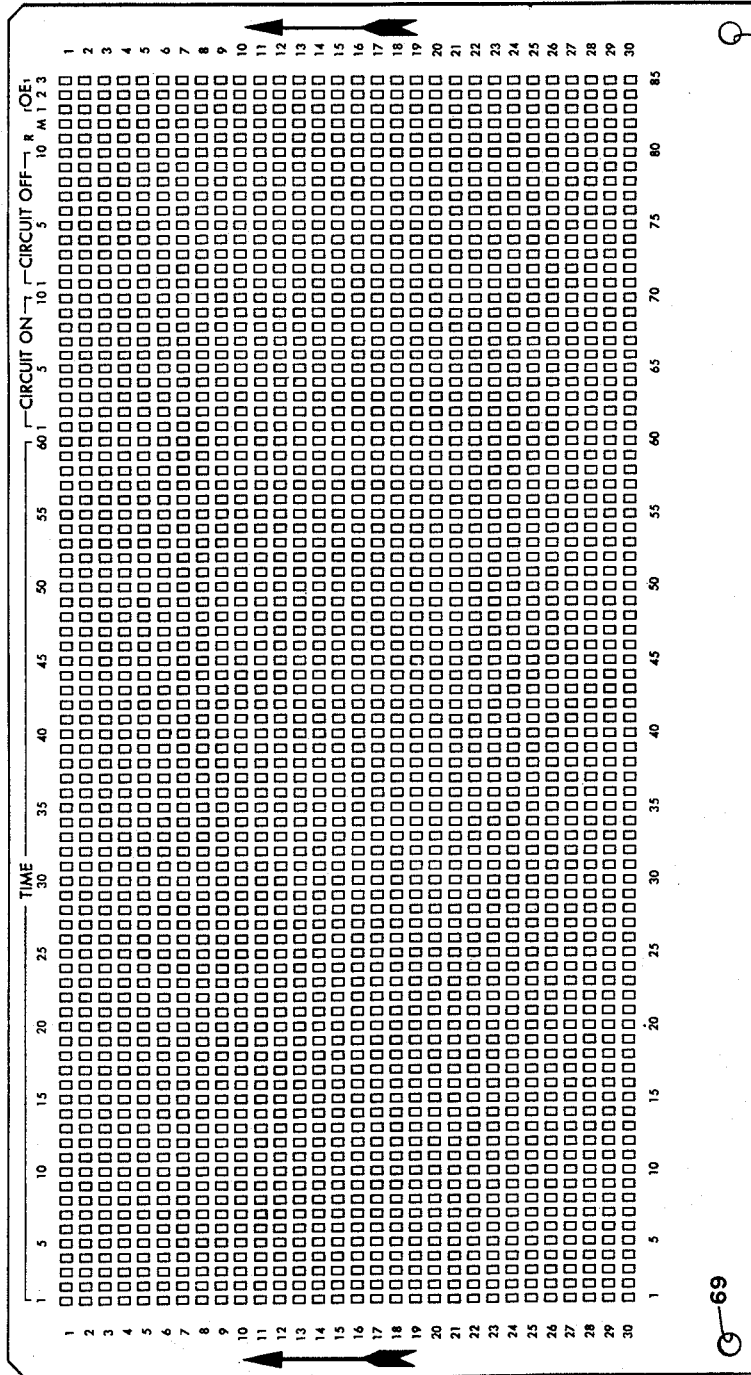
Fig. 1 is a reproduction of a punch card suitable for use in combination with the instrument of this invention.

The extreme flexibility and wide application of the invention will be clear from consideration of Fig. 1 which represents a punch card of a type suitable for use in the apparatus of the invention. Since this card is literally the key to the function of the control apparatus of the invention, the nature and layout of the card are important, although modifications in the one shown could obviously be made provided they be accompanied by corresponding modifications of the apparatus. The punch card in the illustrated example is 5 x 9 inches and of $\frac{1}{100}$ inch vinyl sheet having a matte finish on both sides. On the card, 30 transverse rows of small rectangles are accurately printed in 85 longitudinal columns. Each of these rectangles (hereinafter called "spaces" or "hole locations") comprises the possible position of a corresponding hole through which pairs of contactors connect with each other to actuate the proper circuits. Each of the 30 transverse rows represents one step in the entire cycle covered by the card, and comprises a position of the card as it is moved in successive steps through the instrument.

The 85 longitudinal columns are divided into five general groups of which the first group of 60 columns represents "Time," and each space therein may represent one second or one minute, as determined by the absence or presence of a hole in the column marked "M" below referred to. The second and third groups of columns represent external load "Circuit On" and load "Circuit Off," although they can be grouped together as controlling the load circuits. The fourth group comprises the "R" and "M" columns of which R resets the card and the control circuits back to start (#1) position, at the expiration of the time period represented by the time value of the hole punched in the first group of the same row. "M" shifts the timer to operate in minutes instead of seconds for the time period punched on the same line with the M hole. The fifth group represents "Outside Event" controls, viz., three remote circuits through which the timer control may be interrupted in respect to any load circuit, and thereafter resumed upon the occurrence of a desired outside controlling event or events, as above mentioned.

The embodiment of the invention herein described by way of example provides for 10 external load circuits for which there are suitable terminals on the back of the instrument, so that each of these external circuits may be initially opened or closed at "Circuit On" and subsequently closed or opened at "Circuit Off," as desired.

In the process of operation, the punch card is driven through the cooperating pairs of opposed card-scanning contacts in successive steps, one position, or numbered transverse row, at a time. The card advances immediately upon the expiration of the time represented by a hole in any of the first group of 60 columns. Hence only one time hole is punched in any one row. Once a load circuit is actuated by a hole in a Circuit On column that load circuit remains actuated until a hole in a Circuit Off column of the same load circuit number arrives at the card contacts and the time represented by a Time hole in the same row has expired. If no Time hole is punched in a row, the time value for that row is the maximum, viz., either 60 seconds or 60 minutes. Consequently, the total time period for which any given circuit remains actuated is the sum of the time intervals represented by the time holes (or by no time holes) in all of the rows (hereinafter sometimes referred to as card "positions") intervening between the Circuit On hole and the Circuit Off hole for that particular load circuit. This use of accumulated time intervals is possible in accordance with the invention because of the fact that, at the expiration of the time interval represented in any card position, the timer automatically returns to zero and the card is advanced to the next position. Similarly any or all of the remaining load circuits can be controlled as desired at any time intervals.

From the foregoing it will be seen that the control system of the described embodiment of the present invention makes possible the independent or combined control of any of the external load circuits in periods of from one second to thirty hours, depending upon the manner in which the card is punched. Other time intervals may be had by substitution of timers which operate at other time rates, or by longer cards, although for most commercial purposes the mentioned time range is adequate.

One example of a punched card is as follows: If circuit #1 is to be actuated for 25 seconds, space #1 under Circuit On and space #25 under Time are punched in the first position (row No. 1), and space #1 under Circuit Off in the second position is also punched. Then, when the card is inserted and the instrument started, load circuit #1 will be actuated and will remain so for 25 seconds at which time the timer will return to zero and the card will be advanced one position. When the card arrives at the second position, the "circuit off" contacts for circuit #1 will close, thus deactuating circuit #1. If no time hole is punched in a line, the timer will continue over the entire length of its traverse at which time it will automatically return to zero and the card will advance one position, thus adding that time interval to the previous time intervals, as above mentioned.

A hole in the R column will reset the instrument, viz., when a hole in the R column arrives at the card contacts, the timer resets to zero and the card is returned to its starting or #1 position. A manual control, later described, may be set so that at #1 position the entire operating cycle will automatically repeat, or so that the instrument will remain at rest.

If a time interval is interrupted by one or more "outside events" as permitted by a hole in one or more of the three OE columns, the total elapsed time between the first timed control and the last timed control, as determined by the first time hole and the last time hole in the card, will obviously be extended accordingly, but the uninterrupted timed intervals punched on the card will of course be unaffected.

If a period of more than 60 seconds is required in respect to any card position, a hole is punched in that position under the M column. This in effect applies a multiplying factor of 60 so that each of the 60 time spaces in that row in equivalent to one minute instead of one second. Therefore, 60 minutes is the maximum time period which can be allotted to any card position in the instrument as illustrated. Since the system herein described is arranged to operate in seconds rather than in minutes, it is necessary to punch a hole in the M column in every row which is to be operated in minutes. If all 30 rows are punched in the M column, then the maximum time period for one cycle of this instrument will be 30 hours. It is obvious that the rows need not be straight and that cards carrying more than 30 positions can readily be provided for. If desired, greatly elongated punch cards or tapes, or an endless punch tape, can readily be substituted for the 30-position card illustrated in Fig. 1. If a circular card were used the rows would be disposed radially from the central axis, and the columns would fall on circles.

*Method of operating*

Figure 2:
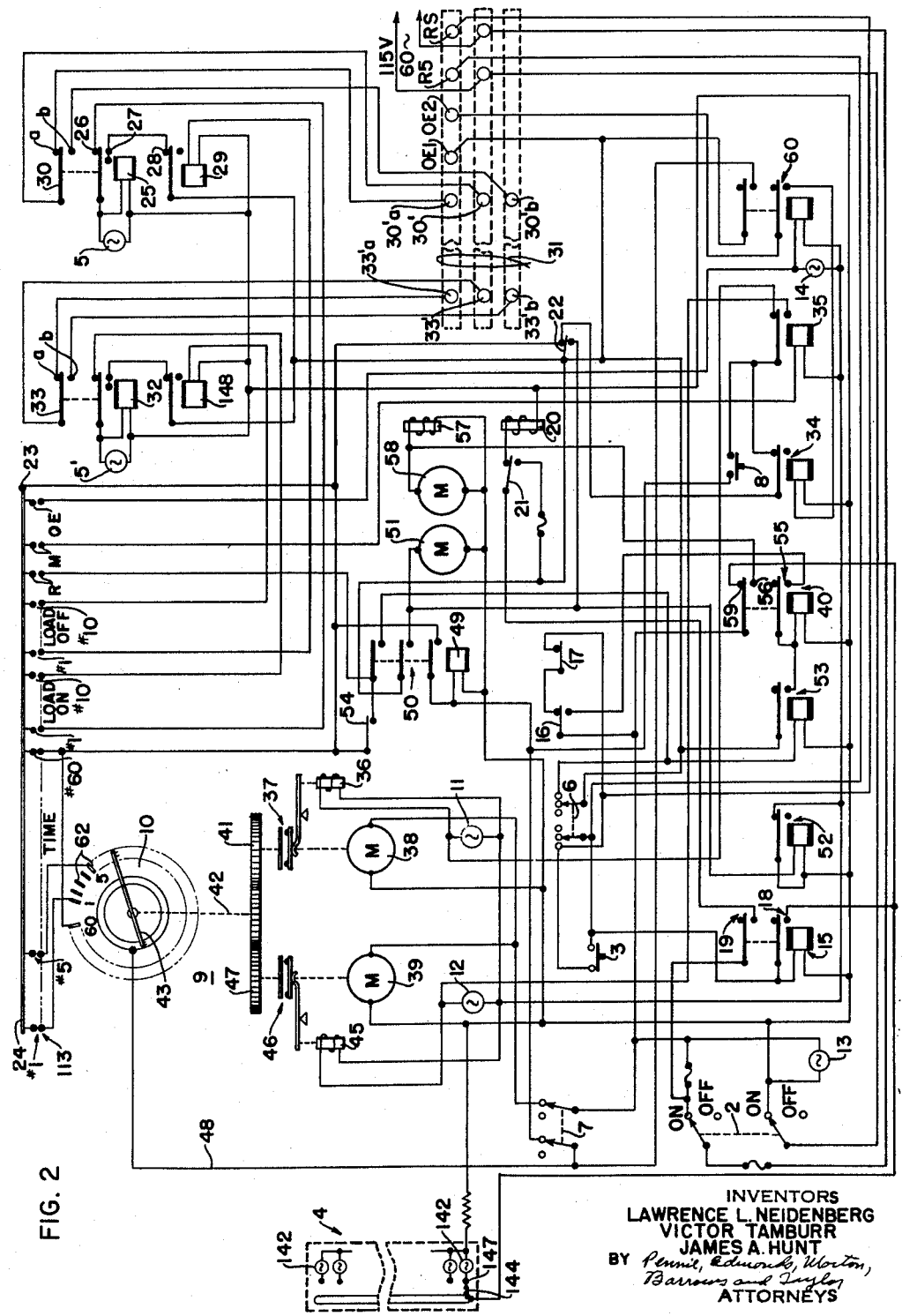
Fig. 2 is a circuit diagram of a preferred embodiment of the invention.
Figure 3:
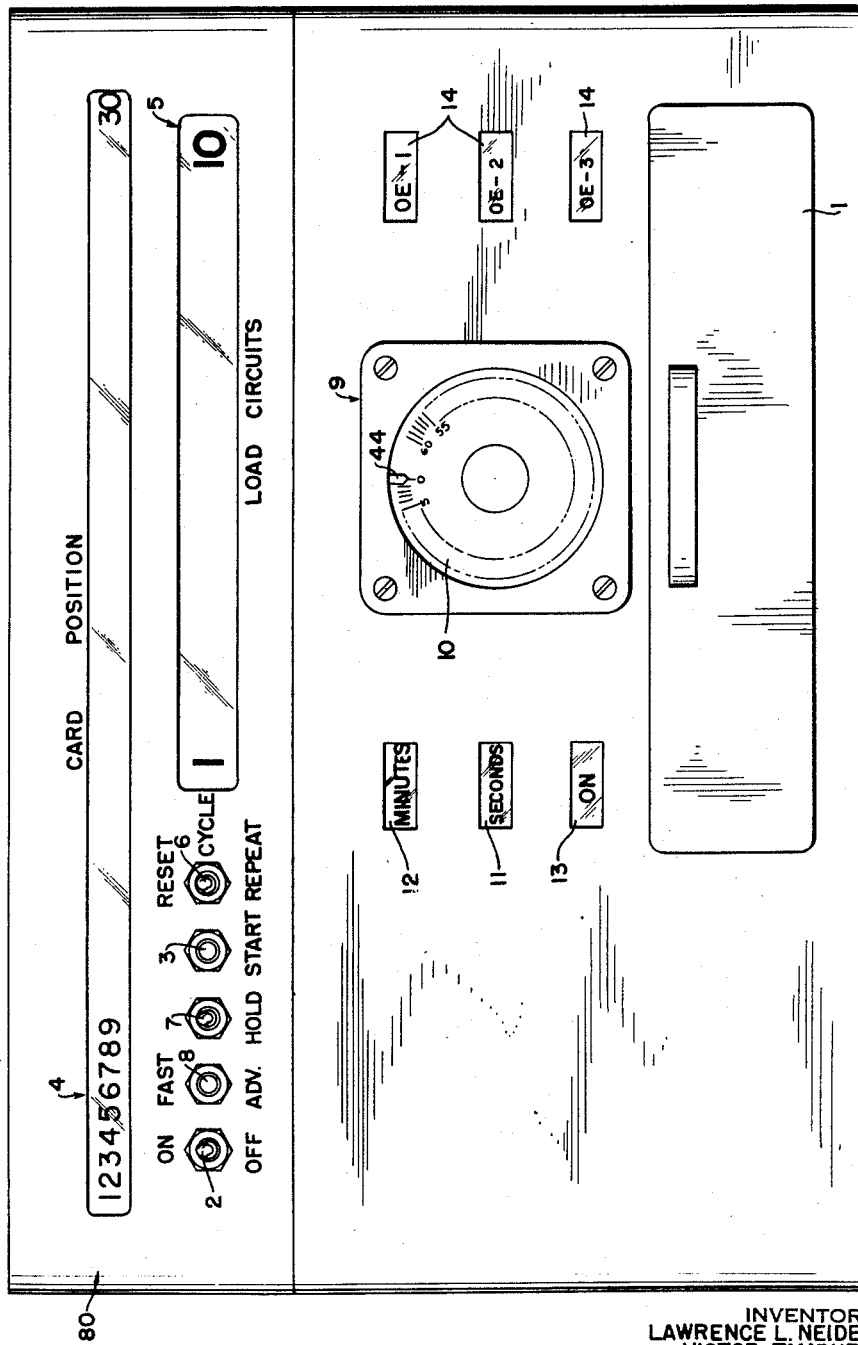
Fig. 3 is a front exterior view in elevation of an instrument incorporating the circuit of Fig. 2; but not in operation.

Fig. 3 is a front view of the instrument which shows its comparative simplicity. By opening the door 1 downward, a punch card may be readily inserted in a card carrier as later described. After the door is re-shut and switch 2 thrown to "On" the instrument may be started by pressing the "Start" button 3. The instrument will then proceed to operate automatically and effect the actuation and deactuation of the external load circuits in accordance with the holes punched in the card. On a terminal board at the rear of the instrument, terminals (marked "RS" in Fig. 2) are connected in parallel to Start button 3, to permit starting the operation from any remote point, which, of course, could be load-circuit terminals of another similar instrument according to the invention.

The "Card Position" indicator 4 comprises a row of numerals from 1 to 30 which are illuminated in sequence to indicate the position of the punch card as it advances in its step-by-step movement. The "Load Circuits" indicator 5 comprises a row of numerals from 1 to 10 which are illuminated or extinguished as the various load circuits are automatically switched on or off as predetermined by the corresponding holes in the punch card. Thus, by observing the numbers illuminated on the indicators 4 and 5, the phase of the control cycle and the particular load circuits "on" and "off" can be ascertained at a glance.

The "Reset" switch 6 is of the three-position toggle type. When this switch is in the central "cycle" position the instrument will return the card to position #1 and terminate the control functions represented by holes in the punch card as soon as the last punched control function has been completed. When the switch is in the downward or "Repeat" position, the instrument will also return the card to the first position as soon as it has completed all of the operations punched on the card, but will automatically repeat the entire cycle until changed. Throwing the switch 6 upwards to "Reset" immediately stops the operation of the instrument and returns the punch card to the first position where the operation stops.

The "Hold" switch 7 halts the entire operation of the instrument at any point in the cycle when it is thrown. The indicator lights and load circuits are, however, undisturbed, so that the phase of the cycle at which the instrument was halted remains as indicated. Throwing the "Hold" switch 7 back to its normal position causes the instrument to resume its operation without other change from the point where it was interrupted.

The "Fast Advance" push button 8 temporarily deactuates the external control functions of the instrument and advances the punch card rapidly through its successive positions, which, as they are reached, are indicated by the Card Position indicator 4. By this means any control functions punched on a card can be skipped and, when the button is released, the control by the punch card will be resumed at the position to which the card has thus been advanced.

The timer 9 with its indicator dial 10 are referred to in more detail hereinafter. It will suffice here to mention that the dial rotates in a clockwise direction as viewed in the drawing of Fig. 3 at a rate of 1 division either per second or per minute, while the timer is measuring any pre-punched time interval. When the timer is operating at the seconds rate, the "Seconds" indicator 11 is illuminated; and when it is operating at the minutes rate, the "Minutes" indicator 12 is illuminated. The "On" indicator 13 is continuously illuminated when the power switch 2 is in the "On" position. The indicators OE–1, OE–2 and OE–3, designated by the reference character 14, are illuminated, respectively, when the correspondingly numbered outside-events circuits are connected through card contacts as a result of holes in the punch card under the OE columns.

*Description of circuit*

The nature of the system according to the invention and the interrelation of the various components thereof will be understood from a description of Fig. 2 which is a circuit diagram of a preferred embodiment of the invention.

Assuming that the power switch 2 is closed as shown, the control cycle is initiated by depressing the start button 3 which actuates the start relay 15 through the circuit including position #1 limit switch 16 which is closed through its upper contact, as illustrated, only when the card carrier (later described) is in #1 position, viz., the card scanning contacts are on position #1 of the card. In all other operating positions of the card this switch 16 is held in connection with the lower contact by spring pressure. This starting circuit also includes limit switch 17 which is a safety device to prevent operation of the instrument when no card is in the card carrier. The correct positioning of a card in the card carrier closes this switch.

Actuation of the start relay closes the lower contacts 18 thereof, locking this relay closed through the upper normally closed contacts of reset relay 40. This connection also applies voltage to Position Indicator 4, which is shown in card position #1 in the diagram. The simultaneous closure of upper contacts 19 energizes contact bar solenoid 20. All of the movable card contacts are connected in common to the contact bar which when moved by solenoid 20 raises them up so as to connect with the fixed contacts except where the material of the punch card intervenes (Fig. 10). This circuit includes contact bar solenoid limit switch 21. The upper contacts of this switch are closed when the movable card contacts are down and separated from each other and from the card. The lower contacts of the switch are closed when the movable card contacts are up in operating position. Thus the contact bar solenoid is deenergized as soon as the contacts are raised into operating position, chiefly to prevent the noise and heating which result from continuous energization of the contact bar solenoid. This is possible because the contact bar is latched in the upper operating position and mechanically held until the latch is released. When limit switch 21 is tripped so as to be down, operating voltage is applied through ratchet limit switch 22 to the terminal 23 of card contact bar 24, and to all points connected therewith. Ratchet limit switch 22, which will be again referred to, is normally closed on the upper contact at each card position and is momentarily closed in its lower position when the card is being moved from one position to the next.

Assuming now that Time and Load On holes #1 are punched in the first position of the card, voltage from contact bar 24 is connected through "load on" contacts #1 to the solenoid of load relay 25, thus actuating relay 25 and illuminating indicating lamp 5. This closes lower contacts 27 and opens upper contacts 26. Contacts 27 hold the actuating circuit closed through contacts 28 of load release relay 29. Actuation of load relay 25 also shifts relay contactor 30 from upper contact *a* to lower contact *b*. Contactor 30 and its cooperating contacts *a* and *b* are connected, respectively, to three external load circuit terminals 30', 30'*a* and 30'*b* on terminal strips 31. From the diagram it will be seen that terminals 30' and 30'*a* are normally closed and are opened by actuation of relay 25; whereas terminals 30' and 30'*b* are normally open and are closed by actuation of relay 25. Consequently, as earlier stated, the external load circuit can be opened or closed, as desired, in response to actuation of the load relay. Hence the terms "actuation" and "deactuation" in reference to the load circuits are not intended as a limitation as to whether those circuits are closed or opened.

Load relay 32 is in similar manner connected to be actuated in response to closure of "load on" contacts #10 so as to open and close external load circuit terminals 33', 33'*a* and 33'*b*. Attention is called to the fact that the lowermost contacts of the load relays are represented as of double type. The purpose of this construction is to close the lower holding contact before the upper contact is broken in order to prevent a possible feedback effect.

The external load circuit or circuits connected to any of the load relays may be restored to normal by deactuation of the associated load relay. This is effected, as above indicated, by a hole in a succeeding card position in the appropriate Load Off column. For example, in this case if "load off" contacts #1 are closed through a punched hole, load release relay 29 will be actuated, opening contacts 28 and opening the holding circuit of relay 25, which, of course, will remain open unless later closed by another hole in the Load On #1 column of a succeeding card position.

The mentioned tripping of limit switch 21 also connects actuating voltage through the normally closed contacts of outside events control relay 34 and through upper, normally closed, contacts of the minutes relay 35 to the "seconds" clutch solenoid 36, thus actuating the seconds timer clutch 37. The seconds synchronous timer motor 38 and the minutes synchronous timer motor 39 were previously connected to the power line through hold switch 7 when the power switch 2 was thrown to "on" position. Hence, these timer motors run continuously and independently while the instrument is in operation except when the Hold switch is thrown. They operate the timer alternatively, depending on which clutch is energized.

The mentioned actuation of seconds clutch mechanism 36, 37 instantly starts the actuation of the timer 9 through transmission 41 and shaft 42 which drives the wiper 43—in this case, at the rate of one timer contact per second. There are 60 contacts evenly spaced around the periphery of the timer, of which only the first 5 and the 60th are shown in the drawing. It will be noted that contacts #1 and #5 on the timer are connected to the fixed contacts of the #1 pair and #5 pair of card scanning contacts, respectively, and that contact #60 is similarly connected to the fixed contact of the #60 pair. It is to be understood that the intervening contacts are also correspondingly connected. As the wiper is driven around its traverse making consecutive connections with the contacts, dial 10 (Fig. 3) moves with it, and the index 44 designates which timer contact is connected at any given instant, and, therefore, how many seconds (or minutes) the timer has run. As the dial 10 is rotated, a helical spring (61, Fig. 10) is proportionately wound so that it returns the wiper to zero when the motor drive is disengaged. In the mentioned example, the wiper and dial are driven at a speed of 1 r.p.m. (or, more accurately, 1 traverse per minute), but if the space in the M hole of position #1 had been punched, contacts M would be closed, actuating minutes relay 35 which deenergizes seconds clutch solenoid 36 and energizes minutes clutch solenoid 45. As in the other case, this actuates minutes clutch 46 and drives the timer through transmission 47 so that the dial and wiper are driven at the rate of 1 r.p.h., or 1 traverse per hour.

The various mechanical operations which include actuation and deactuation of relays, closing and opening of card and switch contacts, movement of the card carrier from one position to the next, and the return of the timer wiper to zero at the conclusion of each timed interval obviously require various periods of time. The greatest of these is the slightly less than ⅗ second required by the wiper to retrace its traverse from the "60" contact to zero. Hence, to compensate for this delay, the transmission between the card advance motor and the card carrier is geared to consume ⅗ second in transporting the card over the distance between two adjacent card positions, and the timer itself is geared so that all intervals which it times are actually ⅗ second less than the time indicated on its dial.

In the presently discussed example, it is assumed that #1 circuit is to be actuated for only one second. If #5 Time hole were punched instead, #1 circuit would be actuated for 5 seconds. Hence when timer contact arm 43 moves from zero to contact #1, voltage is applied from card contact bar 24 through #1 time card contacts to #1 contact on the timer, and thence through lead 48 and hold switch 7 to the solenoid 49 of the end-of-time relay 50, thus actuating this relay and closing its three contacts. The lower contacts are provided to hold the relay actuated because the circuit just traced opens as soon as the timer passes #1 contact. This holding circuit includes ratchet limit switch 22. When the card carrier has moved forward only a very small fraction of an inch (1/60 inch) the ratchet limit switch 22 opens the upper contact which cuts the voltage off from terminal 23 of the card contact bar and from the various circuits above named, to which it is connected. One result of this is to deenergize the clutch solenoid circuits so that the timer wiper is released to return immediately to zero. The simultaneous closing of the lower contact continues operation of the card advance motor. Thus, although the movement of the card carrier is started by actuation of the end-of-time relay, ratchet limit switch 22 immediately assumes control of the carrier advance. As soon as the card reaches the next position ratchet limit switch 22 returns to the upper position, stopping the card advance motor and restoring the operating control circuits which include the timer and the card contacts.

Closing of the center contacts of the end-of-time relay 50 connects operating voltage to the card advance motor 51. This motor is coupled to the mechanism which transports the card carrier forward, moving the card to the next position. The same center contacts of relay 50 also actuate the card advance relay 52, breaking its normally closed contacts. This disconnects the voltage from both timer clutch solenoids 36, 45, and from the magnet of minutes relay 35.

At the termination of the timed interval when the end-of-time relay operates, the timer is returned to zero (by means of the mentioned helical spring), the timer drive is changed from minutes to seconds (if it has been operating by the minutes motor), and the power circuit to all of the load release relay magnets is opened by operation of ratchet limit switch 22. Since all of these relays are of the quick-acting type, these circuits are opened before the card moves, thereby preventing any of the same circuits from being broken by the card contacts. This is important because the card contacts are not sufficiently rugged to make and break current-carrying circuits. Once a load release relay is actuated, its associated load relay is immediately deactuated, so the release relay need operate only on a short pulse.

Closing of the upper contacts of end-of-time relay 50 supplies actuating voltage to the reset start relay 53, closes the circuit to the reset switch 6, to the position #30 limit switch 54, and to the card contact R, so that on closure of any of these three last-mentioned circuits the reset start relay 53 actuates reset relay 40. When relay 40 is actuated it locks itself by closure of contacts 55 through the circuit including position #1 limit switch 16. Switch 16 is closed on the upper contact, as shown, at all card positions except card position #1 at which it is closed down. Actuation of reset relay 40 also, through closure of contacts 56, actuates contact-release solenoid 57 and the card return motor 58.

Simultaneous opening of upper contacts 59 of the reset relay opens the holding circuit of start relay 15. Consequent deactuation of relay 15 cuts off the voltage from the position indicator lamps 4 and from the contact-bar solenoid 20. The opening of the circuit to the contact bar solenoid and the simultaneous actuation of the contact-release solenoid permits the contact bar 24 to drop, thus separating all of the spring-pressed movable contacts from the fixed contacts and from the card. The actuation of card return motor 58 drives the card carrier back to the #1 position. As just above stated, with the card in #1 position, position #1 limit switch closes the upper contact and opens the lower one, as shown in the diagram, which opens the holding circuit of reset relay 40, thus restoring the various circuits to their normal condition ready for initiation of another cycle of the entire control operation.

It was stated above that closure of the upper contacts of the end-of-time relay impresses operating voltage on the manual reset switch, on the position #30 limit switch 54 and on the stationary card contact R, so that on closure of any of these three, the reset start relay energizes the reset relay. Hence the instrument will be rapidly restored to its starting position by any of these means. It will be seen from the diagram that position #30 limit switch 54 is connected in parallel with the card contacts R, so that when either is closed the reset function will commence as soon as the end-of-time relay has closed as a result of the closure of a timing circuit through the timer. Limit switch 54 is located so that when the card carrier has moved the card to the last, or 30th, position, this switch closes and automatically starts the reset function.

Reset switch 6 is a toggle switch of a special type which, if pressed against a spring return in the "reset" direction, connects actuating voltage to the reset start relay 53 just as position #30 limit switch does. Hence, by use of switch 6 the instrument may be reset manually at any desired time in its normal cycle. It will be seen from the diagram that when this switch is in its central or neutral position the carrier will remain at rest in position #1 until it is re-started by the start switch 3, or by remote control to terminals "RS" on terminal strip 31. However, if switch 6 is thrown to the lower "Repeat" position it will remain there and will re-start the cycle whenever the card carrier returns to position #1.

The purpose of the outside event control was mentioned previously. When it is desired to interrupt the time interval punched at any given card position automatically by some outside event or condition, such as when a predetermined temperature or pressure is reached, or manually by an external control, a hole is punched in the OE column at the desired card position. Then as soon as this OE hole reaches the card-scanning contacts, the solenoid of the outside event relay 60 and its indicator 14 are energized through the contacts of the card advance relay 52. Closure of the lower contacts of relay 60 energizes outside event control relay 34 which releases whichever timer motor clutch 36, or 45, is operating, returning the timer to zero. Actuation of relay 60 also completes a circuit including the outside events terminals OE–1 and OE–2, one side of the power line at switch 7, and the end-of-time relay 50, so that the latter relay is actuated by closure of the outside event external circuit. The resultant operation of the end-of-time relay restores the normal control cycle in response to the holes in the punched card.

Those skilled in the art will appreciate from the above description that various external arrangements may be made in order to effect any of a variety of controls to meet special conditions. For example, two outside control circuits can be connected in series to the OE–1

OE-2 terminals so that two conditions must be fulfilled before this circuit is actuated; or two or more outside events can be connected to as many different outside event terminals on the terminal strip 31, and the card punched accordingly. In the instrument and the punch card represented in the drawings, three outside event circuits are provided for, but to simplify the drawing only one is represented in Fig. 2.

The Fast Advance button 8, which is also represented in Fig. 3, is connected to solenoid 49 of the end-of-time relay 50 so that by closing this button the end-of-time relay can be actuated manually at any time during the cycle. The functions of the end-of-time relay have been described above, one being to actuate the card advance motor 51. When the end-of-time relay is actuated by push button 8 and the card carrier has moved slightly, the ratchet limit switch 22 deactuates the end-of-time relay and re-closes the card advance motor circuit, as above stated. Therefore, the card advances rapidly and with only slight hesitation at each position as long as the button is held depressed. Since the lamps in position indicator 4 follow the movement of the card carrier, it is possible by watching this indicator to advance the card to any desired position. If the Fast Advance button 8 is not released, when the carrier arrives at the end of its travel, position #30 limit switch closes and actuates the reset relay which locks itself closed and, as previously explained, the card carrier is then automatically returned to #1 position at which point the reset relay is deactuated by position #1 limit switch. Thus, the carrier can be returned to #1 position by use of the Reset switch or of the Fast Advance button.

*Description of mechanism*

Figs. 3–11, inclusive, are different views of an instrument comprising a preferred embodiment of the invention.

It should be noted that the upper section 80, shown in Fig. 3, has been omitted from the other figures. This upper section is shown as, and preferably comprises, a unitary structure which is separable from the lower section of the instrument, although it is connected thereto by a wire cable. As can be seen in Fig. 3, it includes a row of 30 card-position signal lamps and a row of 10 load-circuit signal lamps, all mounted behind numbered windows. In addition, mounted on it are the various manually operable switches and push buttons referred to in connection with the circuit diagram of Fig. 2. By making this section separable, access to the components in the lower section is facilitated. Also it can be conveniently located to permit remote control of the instrument.

The mechanism is assembled on a base plate 76. Two parallel side rails 77 and 78 of channel section, extending horizontally from the front to the rear, are supported on posts 79 and carry top plate 90. These rails and top plate together support most of the components and sub-assemblies of the instrument.

In the illustrated embodiment the punch card is transported in a metal carrier accurately machined and guided in order to assure alignment of the holes in the punch card with the card contacts which connect with each other through these holes. The carrier 65 represented in this embodiment is essentially a rectangular frame which supports the card along all four of its edges. The central portion of the carrier is open to permit access by the card contacts to all of the hole locations on the card. In order to lock the card in place in the carrier, alignment pins 67 are provided at the two front corners of the carrier. Each of the pins is urged downwardly against the card by a spring 68. When the card is in correct position in the carrier these alignment pins pass through perforations 69 in the card (Fig. 1). It is preferable that these perforations be employed to align the card in the press at the time the hole locations are printed on the card and especially that they be employed to align the card in the hole-punching mechanism (not shown) when the desired holes are being punched in the card in preparation for its use in the instrument of this invention.

In order to lift the pins 67, a cam 70 is provided to slide under the lift 71 which is attached to hinged arm 72 (Fig. 5) to which the pin 67 is also attached. As shown in the drawing, cam 70 is an integral part of slide piece 73, of which there is a reverse duplicate on the right side of the assembly. Hence when these slide pieces 73 are drawn together by pressing upturned ends 74 toward each other, the pins drop through the alignment perforations in the card. Limit switch 17 (Fig. 6) positioned so as to be actuated by movement of one of hinged arms 72 is a safety device which, as described in connection with Fig. 2, permits operation of the instrument to be started only after a card has been inserted in the carrier and locked in alignment as the result of drawing slide pieces 73 together. An equivalent safety switch could be actuated by closure of the door 1 (Fig. 3), or could be arranged to be actuated by the material of the card itself. The thumb notch 75 in the front of the card carrier facilitates the removal of the card from the carrier.

The sectional side view, Fig. 10, shows the construction of the card carrier and adjacent components in more detail. The carrier travels on four rollers 81, two on each side, which bear on the lower inside surfaces of the rail channels shown in Fig. 4. Secured to the bottom of each side piece of the carrier is a rack 82, represented in Fig. 10. Meshing with each rack is a pinion 83 secured to a transverse shaft 84. Thus by rotating shaft 84 the carrier is driven forward or backward in the rails 77, 78. The carrier obviously should be accurately positioned with minimum transverse movement in order to maintain accurate alignment of the card holes with the card contacts. Side rollers 152, one near each corner, guide the carrier transversely.

Pinion shaft 84 is driven through a chain drive transmission shown in Fig. 7. This transmission, as illustrated, includes two jack shafts 85 and 86 each of which is fitted with a sprocket to drive the chain 87. Shaft 85 is also fitted with a gear 88 which meshes with gear 89 attached to pinion shaft 84.

In the embodiment illustrated, shaft 85 is driven in a clockwise direction (as seen in Fig. 7) by card advance motor 51 represented in Fig. 2. Shaft 86 is driven in a counterclockwise direction by card return motor 58. These motors are generally indicated at the left of Fig. 4. In this embodiment, it was convenient to employ a separate non-reversible motor to operate the card carrier in each direction. One advantage in employing two motors instead of one reversible motor is to permit driving the carrier at a higher return speed. Also, motors 51 and 58 here represented are of the integral clutch type in which, when the motor is energized, the armature slides on its shaft and engages an integral clutch coupled to its driving shaft. As soon as the current ceases, a spring disengages the clutch but permits the armature to spin until its inertia is expended, thus providing instantaneous start and stop of the drive shaft.

In connection with Fig. 2 it was explained that the advance drive of the carrier is so timed as to require ⅗ second to advance the card from one position to the next. Hence, the transmission between motor 51 and shaft 84 is provided with such a gear ratio as to achieve this rate of movement of the carrier. Other equivalent drive mechanisms could readily be substituted; or suitable delay could be introduced by a time delay relay circuit. As above mentioned, as soon as ratchet limit switch 22 is actuated it assumes control of the card advance motor 51 and stops it when the carrier has moved a distance equal to the spacing between the centers of adjacent rows of holes, viz., positions of the punch card.

Limit switch 22 is shown in Figs. 7 and 8 to be mounted with limit switch 21 on an angle bracket 91 screwed to the side of rail 77. Switch 22, of which the operating arm and roller 92 are a part, is actuated by cam 93. This cam is formed on an extension of arm 94. The arm and roller 92 of switch 22 are similar in appearance to the arm and roller 99 of switch 21 which are above it and are thus more clearly shown in Fig. 8. Switch 21 is actuated by cam 151 later referred to. The opposite end of arm 94 comprises a dog 96 which, as illustrated in Fig. 8, is shaped to fall into one of the notches of ratchet bar 97. Tension spring 98 urges arm 94 in a clockwise direction so that the end of the dog rides up on a ratchet tooth and drops back into the next notch as the ratchet moves from right to left (as illustrated in Fig. 8) when the card carrier advances. Since ratchet bar 97 is attached to the side frame of the card carrier, the dog 96 is moved slightly in a counterclockwise direction when the carrier is advanced by the drive mechanism above recited. In this embodiment the ratchet teeth are .050 inch high, and the arms 96 and 94 and the cam 93 are so proportioned that when the card carrier has moved .020 inch, limit switch 22 is actuated, viz., the switch arm is thrown from the upper contact to the lower contact as explained in connection with Fig. 2. Cam 100 which is shown in Figs. 7 and 9, although mechanically linked to ratchet limit switch 22, is provided to actuate contact bar limit switch 21 concurrently with the movement of the movable card contacts below described.

The card contacts, first referred to in connection with Fig. 2, comprise a set of fixed contacts and a set of opposed movable contacts arranged to connect with the fixed contacts in pairs through holes in the punch card. These are conveniently disposed in straight rows, although this is not necessary, provided they correspond to the card holes. In Fig. 2 the stationary contacts 113 are represented near the top of the drawing beneath the movable contacts respectively; the latter being connected together by the common conducting bar 24. This bar is shown in end view in Fig. 10 which also shows that in the instrument the movable contacts are below the stationary ones. On this bar are pivoted as many contact fingers as necessary to correspond to the total number of hole locations in a row of the punch card intended to be used in the instrument. In this instance there are, as shown in Fig. 1, 85 hole locations per row, so there must be provided at least 85 contact fingers. However, in accordance with this invention twice that number, or 170 movable contact fingers are provided, viz., two per hole location. Hence, although slight transverse misalignment of the card may prevent one finger from passing through a punch hole, the other finger of the pair will pass through and connect with the fixed contact, because the holes are .075 inch wide and each finger is .02 inch thick.

The contact fingers are punched from flat sheet brass, in the shapes illustrated in Fig. 10. Preferably all the card contacts are rhodium plated to minimize oxidation, and the movable contact fingers carry similar rounded contact points proportioned to pass through the holes in the punch card. As can be seen in the drawing these contact fingers are of two different forms alternately spaced in pairs along bar 24. The fingers of each pair are spaced by a .005 inch washer. These fingers comprise an approximately straight finger 101 and a T-shaped finger 102, respectively, each having a hole 103, 104, respectively, through which a helical tension spring 105, 106, is attached to apply spring loading to the contacts. The two shapes of contact fingers are alternated, as shown, in order to provide a sufficient space for the springs, the opposite ends of which are anchored in the upturned edges of the sheet metal cover pieces 107, 108. In order to provide accurate alignment of the contact fingers and assure their correct spacing, a comb-like metal support 109 is provided. The end of this support is shown in Fig. 10. The "teeth" or partitions 110 are secured edgewise to the plate 111, and are of such width as to comprise spacers between pairs of contact fingers. The thickness of each spacer is substantially the transverse distance between adjacent hole locations in the punch card as viewed in Fig. 1. Since bar 24 passes through bearing holes in all of these partitions 110 it is firmly supported throughout its entire length. On the upper edge of each contact finger a small tab 112 is turned over 90° to form a foot which engages the top edge of the nearest partition 110, thus providing a stop to limit the distance each contact point can move in response to the pull of the spring.

The stationary card contacts which cooperate with the movable contact fingers just described, are immediately above them, as shown in Fig. 10. In the embodiment here described these stationary contacts comprise parallel metallic strips 113 formed by a plating and etching process on the surface of a heavy strip 114 of insulating material. Two rows of contact pins 115 are secured to the opposite side of insulating strip 114 and make connection with alternate contacts.

As the punch card is advanced between the above-described movable and stationary contacts, the matte surfaces of the card rub on the surfaces of both metal contacts with considerable friction, which burnishes them and keeps them free of dust. The total pressure of all of the movable spring-pressed contacts against the card is of the order of 3 pounds.

The movable contacts with their support 109, as above described, are secured to a swinging arm 116 which is pivoted on a pivot sleeve 117. Cover plates 107, 108 are secured to this same arm 116. It will be seen, therefore, that all of the movable contacts are pressed upwardly against the bottom of the card when the arm 116 is in the operating position as illustrated in Fig. 10, and that they fall away from the card when the arm 116 is permitted to drop a short distance. This movement of the contact supporting arm 116 into and out of operating position is effected by a toggle mechanism 118 which is operated by rotation of contact control shaft 119. Shaft 119 is rotated over a sufficient angular distance by means of lever arm 120 secured thereto (Fig. 7). Solenoid 20 operates lever arm 120 by means of plunger 121 and link 122. When the solenoid is deactuated, plunger 121 and lever 120 fall downwardly by gravity. When solenoid 20 is actuated it is mechanically latched in the actuated position so that the movable contacts remain in their up or operating position even though the solenoid then becomes deenergized. The latch is shown in Fig. 7 to comprise a latch arm 123 into which the latch dog 124 engages. It is unlatched by actuation of release solenoid 57. Dog 124 is secured to shaft 119 and rotates with it. In doing so, link 125 causes cam arm 126 to swing on pivot 127, thus actuating cam 100 above referred to in connection with Fig. 9. Hence, when the movable contacts are in their down and disengaged position, the cam 100 moves cam follower pin 128 in the direction of the arrow shown in Fig. 9, and thus arm 94 (Fig. 8) moves counterclockwise to disengage dog 96 from ratchet 97 which actuates limit switch 22 and causes cam 151 to actuate limit switch 21. Cam 151 is supported on post 149 to which it is attached by a screw 150. The actuation of switch 22 by movement of arm 94 can be closely adjusted by manual rotation of cam 151 which is then locked in position by screw 150.

Limit switch 16 is represented in Fig. 2 as a single-pole double-throw switch. However, in Fig. 10 this is shown as two switches. In this embodiment it was found convenient, especially as to flexibility of adjustment, to employ two single-pole single-throw switches both secured to the top plate 90 but connected as shown in Fig. 2. They are both actuated by adjustable stops 129 and 130 which are mounted on the rear of the card carrier by a bracket 131 which moves forward and backward with the carrier through a central slot in the top plate 90. Near the rear edge of top plate 90 another limit switch 54 is mounted so as to be actuated by bracket 131 when the card carrier is in its extreme advanced position corresponding to position #30 on the punch card, Fig. 1. This switch was referred to as "position #30 limit switch" in connection with Fig. 2.

In connection with Figs. 2 and 3, it was pointed out that the position occupied by the punch card during any given time interval of operation of the instrument is shown by the illumination of the appropriate number on the card indicator 4. At the left of Fig. 2 a row of 30 indicator lamps 142 are represented as being energized in succession as the sliding contactor 144 moves along from one lamp contact to the next. The mechanism by which this is accomplished is illustrated in Fig. 5 wherein the sliding contactor 144 is shown to be mounted on an insulating strip 145 which in turn is carried by card carrier 65. The mentioned contactor 144 as it moves along with the carrier makes connection with successive fixed contacts mounted above it in the surface of an insulating panel 146. One such fixed contact 147 is shown in the drawing.

Referring to Figs. 4, 10 and 11, the timer 9 is shown to have a dial 10 subdivided into 60 divisions which represent either seconds or minutes as indicated by the indicating lamps 11 and 12 (see also Fig. 3). Index 44 designates the elapsed time. The timer includes a wiper 43 which is secured to the dial so as to rotate with it and thus make successive connection with the contacts 62. Alternate contacts are connected, by printed circuit technique on insulating panel 63, to a double row of timer terminals 64 (Fig. 4) from which connections are made respectively to the mentioned "time" group of stationary card contacts.

The timer mechanism shown in Figs. 10 and 11 comprises the mentioned seconds and minutes timer motors 38 and 39 which are coupled by suitable gear trains through two similar clutches to timer shaft 42. One of these clutches, 37, is shown in Fig. 10. This one, which happens to be the seconds clutch, is actuated by solenoid 36. This solenoid when energized attracts armature 132 which moves clutch actuating arm 133 to the right in the drawing. The gear train causes the short shaft 136 to rotate at the required speed thus to drive movable clutch plate 134 which is keyed thereon so as to rotate with the shaft and yet to be slidable longitudinally thereon. Driver clutch plate 134 which is continuously driven by the motor carries symmetrically disposed rubber pads 135 which press against driven clutch plate 137 when arm 133 moves to the right. The two clutch plates are urged apart by spring 138. A short shaft 139 which is attached to driven plate 137 thus is driven by it. To shaft 139 the inside end of a helical spring 61 is secured. The outside end of this spring is attached to the front supporting plate 140 of the timer. Thus, when shaft 139 rotates in a direction to drive the timer arm 43, spring 61 is wound proportionately, and it returns the arm to its start or zero position as soon as the clutch is disengaged. Shaft 139 of the seconds timer is coupled by gear train 47 to timer shaft 42 by the same gear ratio as that by which the minutes timer is coupled by gear train 41 to shaft 141.

In the foregoing description of one embodiment of this invention alternative arrangements and possible substitutions of components have been mentioned in a few instances. Some of these would require corresponding changes in other components. For example, if an elongated punch card were employed as above proposed, the described card carrier would obviously have to be replaced by other suitable card or tape transporting means, such as a sprocket mechanism of the nature used for transporting moving picture film in cameras or projectors. This would also require sprocket holes along the edges of the cards or tapes. Additional alternatives and substitutions embraced by the appended claims will occur to those skilled in the art who, after having read the above specification, have acquired an understanding of the principles of the invention.

We claim:
1. In a punch card control system, a plurality of contacts disposed in opposed pairs to connect through holes in a punch card, timer mechanism including a moving wiper arranged to make successive individual connection with each of said contacts in uniformly timed sequence for each forward excursion of the wiper, means for selectively operating said mechanism at a plurality of different related uniform time rates, and circuit means connected between said mechanism and a contact of one of said pairs for changing at the commencement of a forward wiper excursion the time rate of operation of said mechanism from one to another of said related time rates in response to the connection of said last-named pair of contacts through a hole in a punch card.

2. In a punch card control system, a timer including a series of uniformly spaced contacts, a wiper arranged to connect with said contacts progressively in predetermined uniformly timed sequence, timer motor means adapted to operate continuously, transmission means for driving said wiper by said motor means at a plurality of different predetermined time rates, clutch means for coupling said wiper selectively to said motor means through said transmission means, a pair of opposed contactors adapted to close through a hole in a punch card, and circuit means interconnecting said contactors and said clutch means for selectively controlling the operation of said clutch means in accordance with the existence or non-existence of a hole in the punch card, whereby to control the time-rate of operation of said wiper.

3. In a punch card control system, a timer including a series of sixty uniformly spaced contacts constituting a traverse, a contact wiper arranged to connect with said contacts progressively, two timer motors, one motor having transmission means for driving said wiper at the rate of one contact per second and the other motor having transmission means for driving the wiper at the rate of one contact per minute, clutch means for coupling said wiper alternatively to either motor through its transmission means, a pair of opposed contactors adapted to close through a hole in a punch card, and circuit means interconnecting said contactors and said clutch means for selectively controlling the operation of said clutch means respectively in accordance with the actuation of said contactors depending upon the existence of a hole in the punch card therebetween, whereby selectively to control said timer to operate at the rate of one minute or of one hour per traverse of said wiper.

4. In a punch card control system, a row of individually spring-pressed contactors, a movable contactor bar supporting said contactors, means for connecting said contactors in common to a source of operating voltage, an insulating panel carrying stationary contacts cooperating with said contactors, respectively, to comprise pairs of opposed contacts, means for moving a punch card between said pairs of contacts, means for moving said bar so that said contactors are adapted resiliently to connect with said contacts through holes in a punch card, a timer having a series of spaced contacts, a wiper arranged to connect with said timer contacts progressively, timer motors each having transmission means for driving said wiper at a different time rate, clutch means for coupling said wiper alternatively to either motor through its transmission means, control circuits, means connecting certain of said stationary contacts to certain of said control circuits to be energized by closure of said certain stationary contacts with their respective cooperating contactors, circuits linking said stationary contacts and said timer contacts, and circuit means interconnecting said clutch means and a preselected pair of contacts for selectively controlling the operation of said clutch means in accordance with the existance of a corresponding hole in a punch card, whereby selectively to control the operation of said timer according to either of said time rates and thereby respectively to control the timing of actuation of said certain control circuits.

5. In a punch card control system adapted to accommodate a punch card having a plurality of equally spaced rows of hole locations, a plurality of movable and fixed card contacts disposed, respectively, in opposed cooperating pair arranged in a straight row, said pairs of contacts being divisible into at least three groups comprising a plurality of pairs each, the pairs of a first group representing time intervals, the pairs of a second group representing load circuits "on" and the pairs of a third group representing load circuits "off," circuit means for connecting a first row of said contacts to one side of an electric power line, a timer having a plurality of uniformly spaced contacts representing units of time, a wiper arranged to connect with said timer contacts progressively, motor means for moving said wiper at a predetermined time rate in a forward direction starting from zero position, a connection from each of the second row of contacts in said first group to a corresponding contact of said timer, a plurality of load-control relays each having locking means and two actuating terminals, one actuating terminal of each relay being connected to the other side of said power line and the second actuating terminal of each relay being connected respectively to a contact in the second row of said second group, unlocking means associated with each load-control relay, a connection from each unlocking means to a contact in the second row of said third group for actuating said unlocking means, card-carrier means for transporting a punchcard between said pairs of contacts in discrete steps equal to the distance between centers of adjacent rows of holes in a punch card, means for driving said card-carrier means, an end-of-time relay having actuating means connected between said wiper and said other side of said power line so as to be actuated in response to simultaneous connection of a pair of card contacts in said first group and of the corresponding timer contact with said wiper, release means for releasing said wiper to return to zero position, circuit means including contacts on said end-of-time relay for actuating said means for driving the card carrier means, first means operated in response to movement of the card-carrier means over a first predetermined incremental distance for actuating said release means, and second means operated in response to movement of the card-carrier means over a second predetermined incremental distance for deactuating said driving means.

6. In a punch card control system adapted to accommodate a punch card having a plurality of equally spaced rows of hole locations, a plurality of opposed card contacts cooperating in pairs of which the contacts of each pair are adapted to connect with each other through holes in a punch card, said pairs of contacts being divisible into a plurality of groups; the pairs of a first group representing time intervals, the pairs of a second group representing load circuits to be controlled, and the pairs of a third group representing outside events, a timer having a plurality of uniformly spaced contacts representing units of time, a wiper arranged to connect with said timer contacts progressively, a connection from each of the contacts in said first group to a corresponding contact of said timer, a plurality of load-control relays, connections from contacts in said second group to said relays for selectively controlling the operation of the same, means for transporting a punch card between said pairs of contacts in steps equal to the distance between centers of adjacent rows of hole locations in the punch card, motor means for driving said transporting means, an end-of-time relay having actuating means connected to said wiper so as to be actuated in response to simultaneous connection of a pair of card contacts in said first group and of said wiper with a timer contact which is connected to one of said pair of card contacts last mentioned, outside-event relay means connected to a contact in said third group so as to be actuated in response to closing of a pair of contacts in said third group, interconnected circuit elements including contacts on said outside-event relay means for interrupting the operation of said timer, circuit means including connections to an outside-events circuit and contacts on said outside-event relay means for actuating said end-of-time relay, and connections from contacts on said end-of-time relay to said motor means for actuating said motor means in response to actuation of said end-of-time relay.

7. A punch card control system by which a plurality of external load circuits can be automatically closed and opened at any preselected times within a given total period, which includes circuit closing and circuit opening relay means for controlling each external load circuit, a row of card contacts adapted to close in opposed pairs through holes in a punched card, certain different contacts of said pairs being connected to operate said relay means respectively, a timer having a series of contacts connected to other different contacts of said pairs, mechanism for advancing said timer and for resetting said timer to zero, card-transporting means adapted to accommodate a punch card having hole locations disposed in uniformly spaced transverse rows and in spaced longitudinal columns, a first group of columns representing time intervals, a second group representing certain load circuits closed and a third group representing said load circuits open and each of said rows representing at least one time control interval, drive means for transporting a punch card between said pairs of contacts in discrete steps equal to the distance between centers of adjacent rows of hole locations in the punch card, and circuit means interconnecting said card contacts, said relays, said mechanism and said drive means such that the circuit-closed and circuit-open controls of said external load circuits are selectively actuated according to the transverse locations of holes in said second and third groups of columns of the card at the expiration of time intervals determined according to the transverse locations of holes in said first group of columns of the card.

8. In a punch card control system, a plurality of opposed card contacts adapted to close in pairs through holes in a punch card, the pairs of contacts in a first group thereof representing time intervals, a pair of card contacts exclusive of said group providing control in response to an outside event subsequent to a time represented by one of said pairs of card contacts in the first group, an interval timer connected with said first group of contacts in a timing circuit, an end-of-time relay connected to be actuated by energization of said timing circuit in response to closure of a pair of card contacts in said first group, load-control circuit means for controlling an external load circuit in response to operation of said end-of-time relay, means for connecting an outside-event control circuit to said control system, outside-event relay means connected to be actuated in response to closure of said outside-event card contacts, and connections between said outside-event relay means, said timer and said end-of-time relay by which actuation of said outside-event relay means by closure of said outside-event card contacts deactuates said timer and connects said outside-event control circuit to said end-of-time relay so that said end-of-time relay is adapted to be controlled through said outside-event control circuit.

9. In a punch card control system, a plurality of opposed card contacts adapted to close in pairs through holes in a punch card, the pairs of contacts in a first group thereof representing time intervals, a pair of card contacts exclusive of said group providing control in response to an outside event at a time represented by one of said pairs of card contacts in the first group, an interval timer connected with said first group of contacts in a timing circuit, an end-of-time relay connected to be actuated by energization of said timing circuit in response to closure of a pair of card contacts in said first group, card transporting means for transporting a punch card between said pairs of card contacts, means controlled in response to operation of said end-of-time relay for driving said transporting means, load-control circuit means for controlling an external load circuit in response to operation of said end-of-time relay, means for connecting an outside-event control circuit to said control system, outside-event relay means connected to be actuated in response to closure of said outside-event card contacts, and circuit means connected between said outside-event relay means, said timer and said end-of-time relay by which actuation of said outside-event relay means by closure of said outside-event card contacts deactuates said timer and connects said outside-event control circuit to said end-of-time relay so that said end-of-time relay is adapted to be controlled through said outside-event control circuit, whereby said external load circuit and said driving means are controllable through said outside-event control circuit independently of said timer as predetermined by the locations of holes in the punch card.

10. In combination, a time-based control system and a punch card adapted to control the same, said card comprising a plurality of hole locations disposed in spaced rows, and in columns divisible into groups, said rows and columns being angularly disposed with respect to each other, the hole locations in a first group of columns representing different time intervals, and the hole locations in a second group of columns representing different load circuits to be controlled, said system including opposed card contacts disposed and adapted to close in pairs through holes in said punch card, means for transporting said card between said pairs of contacts in the direction of said columns in discrete steps respectively equal to the corresponding distance between centers of adjacent rows of hole locations, terminal means for connecting a plurality of external load circuits to said system for actuation and deactuation control thereby, unitary timer means adapted to measure a plurality of time intervals singly in succession, each time interval being represented on said card by not more than one hole per row of said first group, and the control of each load circuit being represented by two holes respectively in different rows and in different columns of said second group, circuit means including driving means for said card transporting means interconnected with said timer means which causes said card to advance one row at the conclusion of each timed interval, and circuit means linking the terminals for each load circuit with two different pairs of card contacts in said second group, relay means connected to one of said last-mentioned pairs of card contacts operable to initiate load circuit actuation and relay means connected to the other pair of card contacts operable to initiate load circuit deactuation, such that the elapsed time between the actuation and deactuation of a given load circuit comprises the sum of all the time intervals represented in the rows of the card which intervene and include said two holes in said second group.

11. In a punch card system for controlling external load circuits, a plurality of opposed card contacts disposed to connect in pairs through holes in a punch card, means adapted to transport a punch card in a forward direction between said pairs of contacts in a succession of discrete positions, drive means for actuating said transport means, a timer, first circuit means including certain of said card contacts for initiating control of an external load circuit and for simultaneously initiating operation of said timer, second circuit means including said timer and other card contacts for energizing said drive means whereby to move said transport means and thereby a punch card from one position to the next position, a source of circuit-operating voltage in said system, a common bus connected in parallel to all of said card contacts and serving to apply said voltage thereto, first switch means connected between said source and said bus actuated by said drive means and arranged to open at the commencement of movement of said transport means from each fixed position and before said transport means has moved a distance sufficient to open any pair of card contacts by interposition of a card therebetween whereby to prevent arcing at the card contacts, said switch means being further arranged to close when said transport means has reached the next succeeding position, and second switch means actuated by said drive means substantially simultaneously with said first switch means for connecting said drive means to said voltage source while said card contacts are disconnected therefrom during movement of said transport means between said positions.

12. In a punch card control system, a plurality of opposed card contacts disposed to connect in pairs through holes in a punch card, a source of circuit energizing voltage in said system, means for transporting a punch card between said pairs of contacts, drive means for actuating said transporting means, connections between a pair of card contacts and said drive means for controlling the actuating current thereto, common connecting means serving to apply circuit-energizing voltage to said contacts, switch means in circuit with said connecting means to control the voltage thereto, means for actuating said switch means substantially simultaneously with actuation of said transporting means to disconnect said voltage from all said card contacts prior to the separation of any of said card contacts by means of movement of a punch card therebetween, whereby to prevent arcing at the card contacts, and additional switch means connected to said drive means and operable substantially simultaneously with the first-named switch means for connecting energizing voltage to said drive means, while said voltage is disconnected from said card contacts during actuation of said transporting means.

13. In a punch card control system, a plurality of opposed card contacts disposed to connect in pairs through holes in a punch card, means adapted to transport a punch card between said pairs of contacts in a succession of discrete positions, a timer including a plurality of equally spaced timer contacts disposed between a first point and a last point in uniform divisions of a predetermined time interval, a wiper adapted to transverse said timer contacts from said first point in regular succession, timer reset means for returning said wiper in the opposite direction to said first point from any contact in said traverse at a rate more rapid than its timing rate, and means including means for actuating said transport means simultaneously with the return of said wiper to said first point at a rate such that the time consumed in moving a punch card from one card position to the next succeeding card position at least equals the time required by said wiper in simultaneously returning from said last point to said first point.

14. In a punch card control system, a group of 60 pairs of opposed card contacts disposed to connect in pairs through holes in a punch card, means for transporting a punch card between said pairs of contacts, a timer of the type having sixty uniformly spaced timer contacts and a wiper adapted to make connection with said timer contacts in regular timed succession comprising an inter-contact motion rate equivalent to $\frac{1}{60}$ of the time of a forward excursion which includes all said contacts, first circuit means including a connection from each of said timer contacts to a corresponding card contact of each pair in said group, control-circuit relay means, second circuit means connecting said timer to said relay means to operate the same, drive means for advancing said wiper at two different time rates having a ratio of 1:60, rate-changing means for controlling said drive means so that said wiper is adapted to connect with said contacts successively at either of said time rates, and circuit means including additional card contacts for selectively operating said rate-changing means in accordance with a hole in a punch card.

15. A control system according to claim 14 in which said timer wiper has a zero position, means operable at the expiration of each successive timing period represented by a hole in a punch card for returning said wiper from any timer contact represented by its respective punch card hole to zero position at a rate much greater than its fastest rate in the forward direction, and means for automatically returning said wiper to said zero position when said wiper connects with a certain timer contact following the fifty-ninth.

16. In a punch card control system, a plurality of opposed card contacts adapted to close in pairs through holes in a punch card, said pairs comprising a row of fixed contacts and a row of movable contacts disposed to cooperate therewith, said fixed contacts comprising a series of areas of conducting material, and each of said movable contacts comprising a set consisting of a plurality of plate-like rigid metal fingers, a rod on which said fingers are pivoted so as to swing in planes normal to the axis of said rod, and spring means secured to each finger urging a portion thereof towards its corresponding fixed contact, each set of contact fingers having a total thickness slightly less than the width of a punch-card hole such that at least one finger of a set will pass through a hole notwithstanding lateral displacement of the card by a distance nearly equal to one-half the width of the hole.

17. In a punch card control system, a plurality of card contacts disposed in opposed pairs to connect through holes in a punch card, a timer calibrated in standard, uniform time units and including a series of uniformly spaced timer contacts, a wiper arranged to connect with said timer contacts progressively at a predetermined uniform rate from a start position to a maximum position, motive means for driving said wiper from start position at said rate, means actuated by closure of contacts through a hole in a punch card for releasing said wiper from said driving means and means for rapidly returning the released wiper to start position from any timer contact up to and including said maximum position, card-carrying means for moving a punch card between said card contacts in discrete steps equal to the distance between the centers of adjacent rows of holes in a punch card, and actuating means for moving said card-carrying means including mechanism having a time period of operation such that the time consumed in moving a punch card from one row of holes to the next is at least as long as the time required for said wiper to return from said maximum position to said start position, said motive means being adapted and arranged to drive said wiper at a rate such that the time consumed by the wiper in moving from one contact to the next is less than one of said standard time units by an amount equal to said time consumed in moving a punch card from one row of holes to the next row.

References Cited in the file of this patent

UNITED STATES PATENTS

| | | |
|---|---|---|
| 2,573,405 | Clark | Oct. 30, 1951 |
| 2,646,733 | Ackerman | July 28, 1953 |
| 2,656,109 | Lindars | Oct. 20, 1953 |
| 2,695,379 | Myers | Nov. 23, 1954 |
| 2,744,172 | Porter | May 1, 1956 |
| 2,811,202 | Schild | Oct. 29, 1957 |